Dec. 1, 1925.

L. D. SOUBIER 1,563,933

GLASS FORMING MACHINE

Filed Oct. 2, 1922

INVENTOR
LEONARD D. SOUBIER
BY J. F. Rule.
HIS ATTORNEY

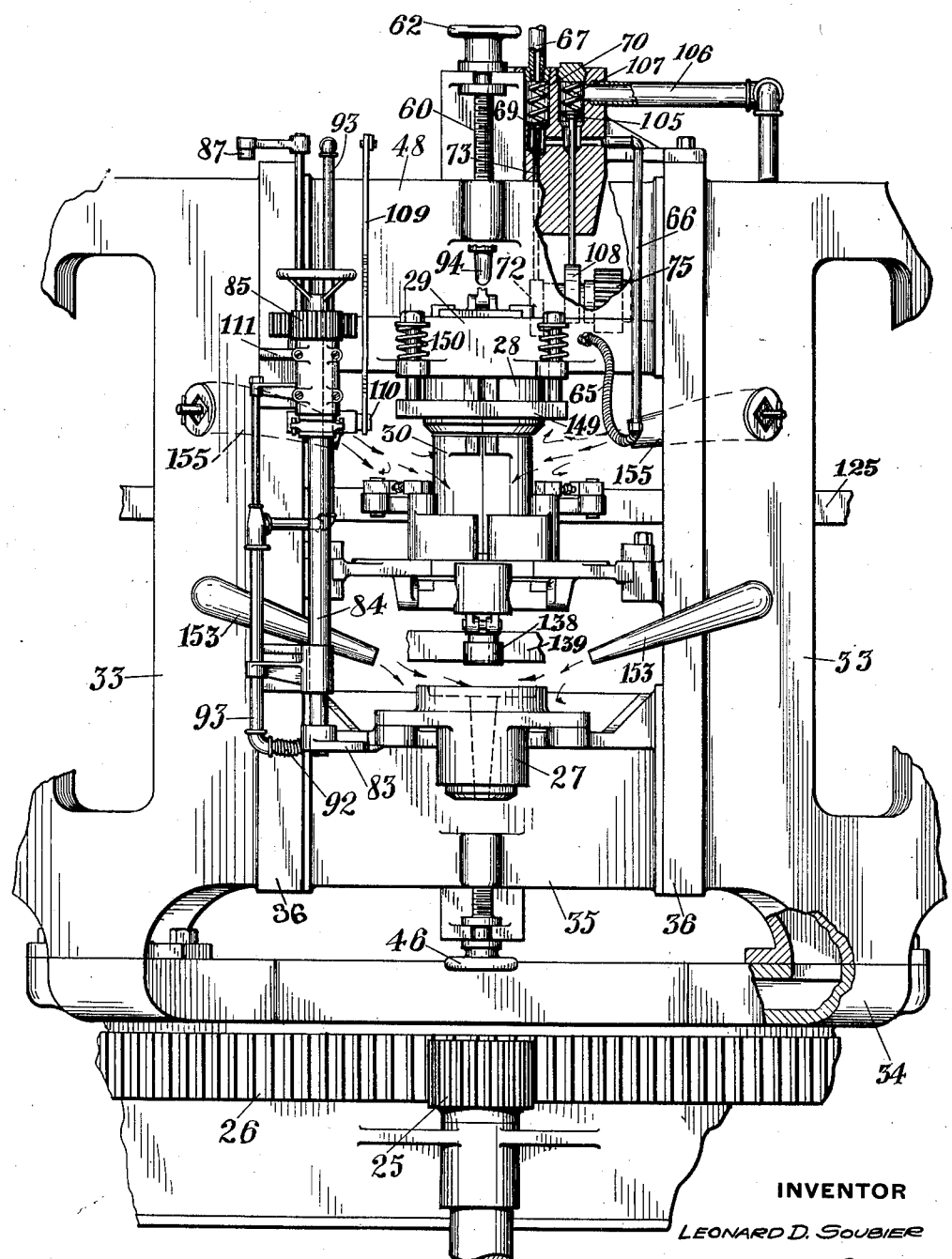

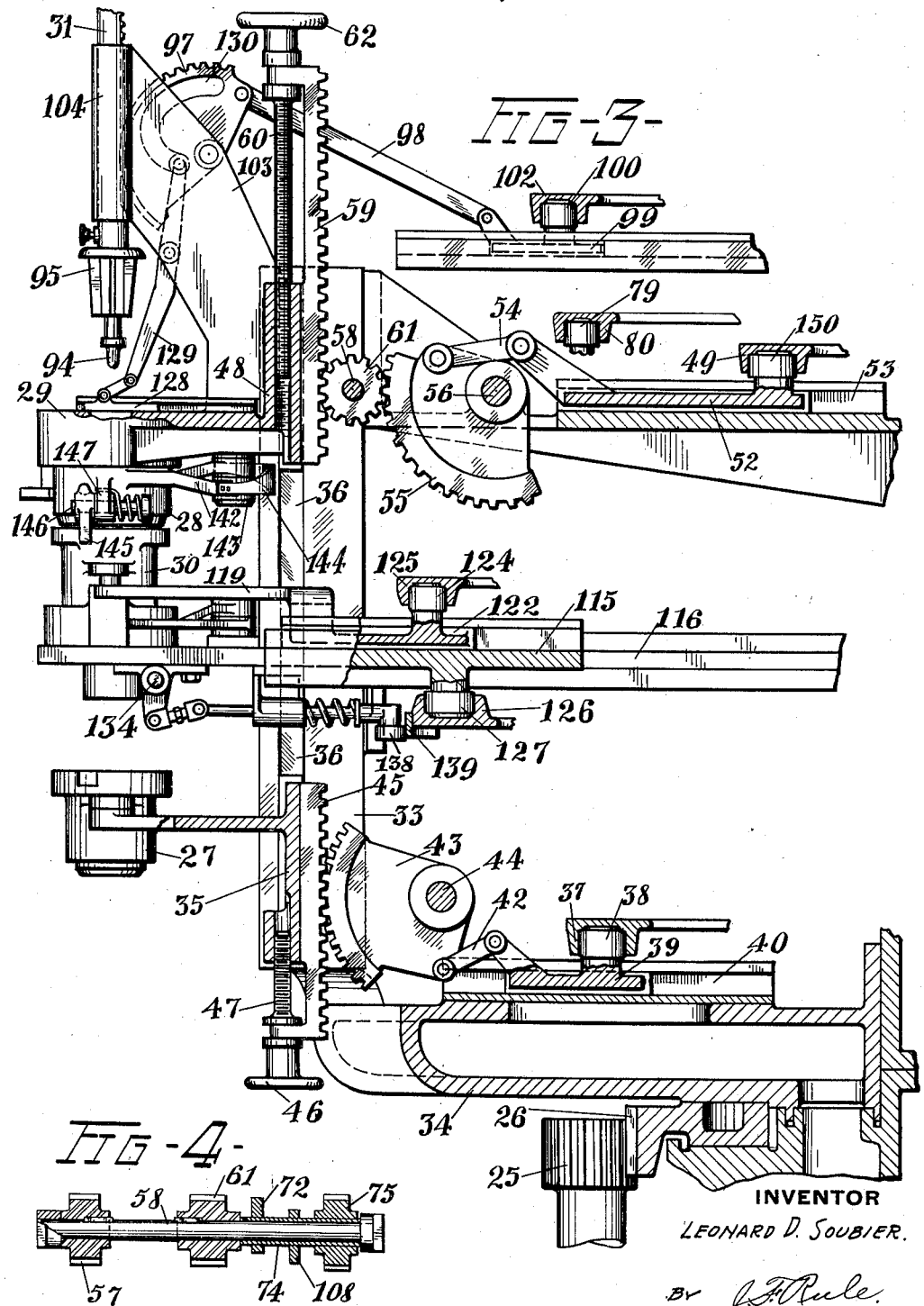

Dec. 1, 1925.
L. D. SOUBIER
GLASS FORMING MACHINE
Filed Oct. 2, 1922
1,563,933
6 Sheets-Sheet 4
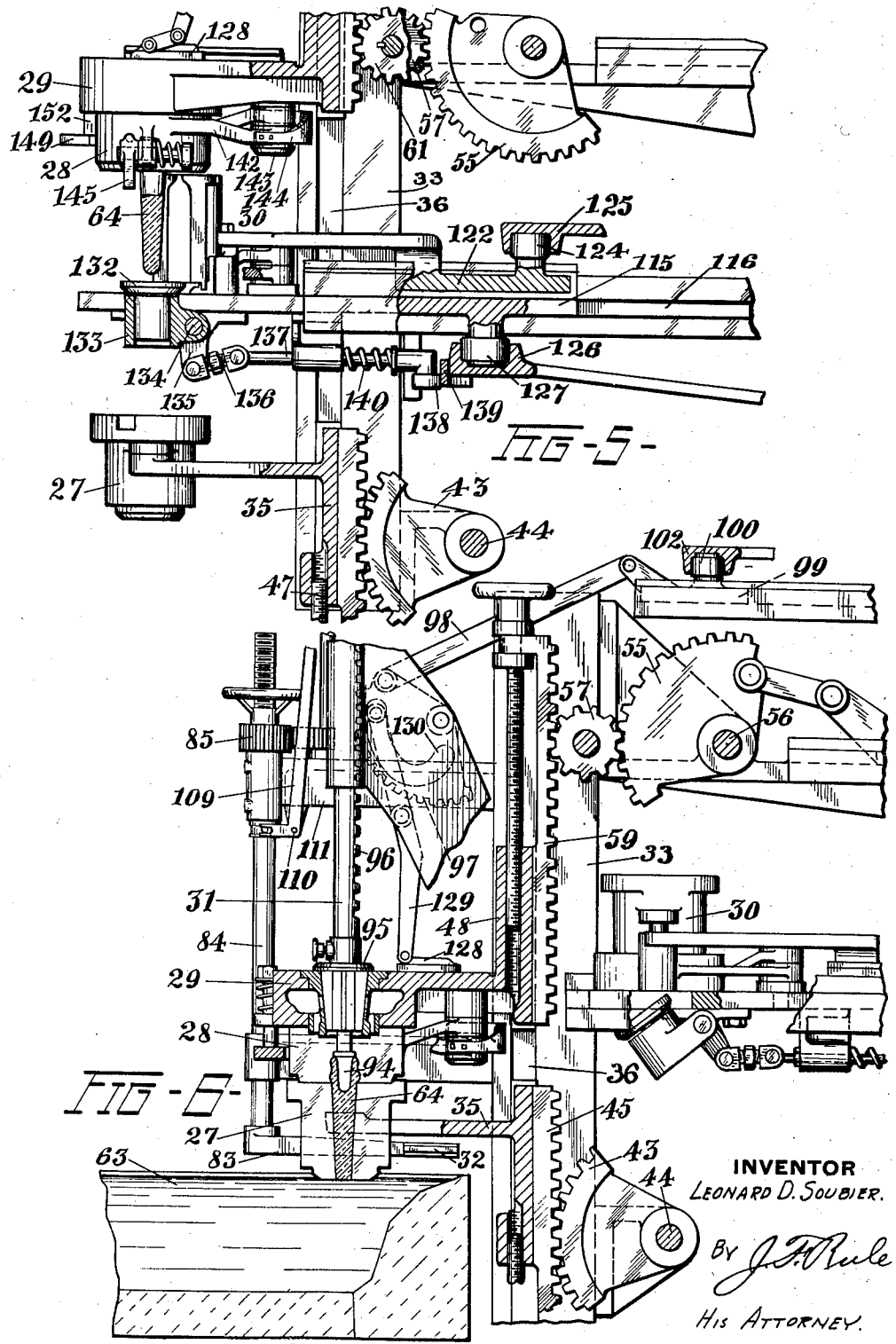
INVENTOR
LEONARD D. SOUBIER.
By J. F. Rule
His ATTORNEY.

Dec. 1, 1925.
L. D. SOUBIER
1,563,933
GLASS FORMING MACHINE
Filed Oct. 2, 1922    6 Sheets-Sheet 5
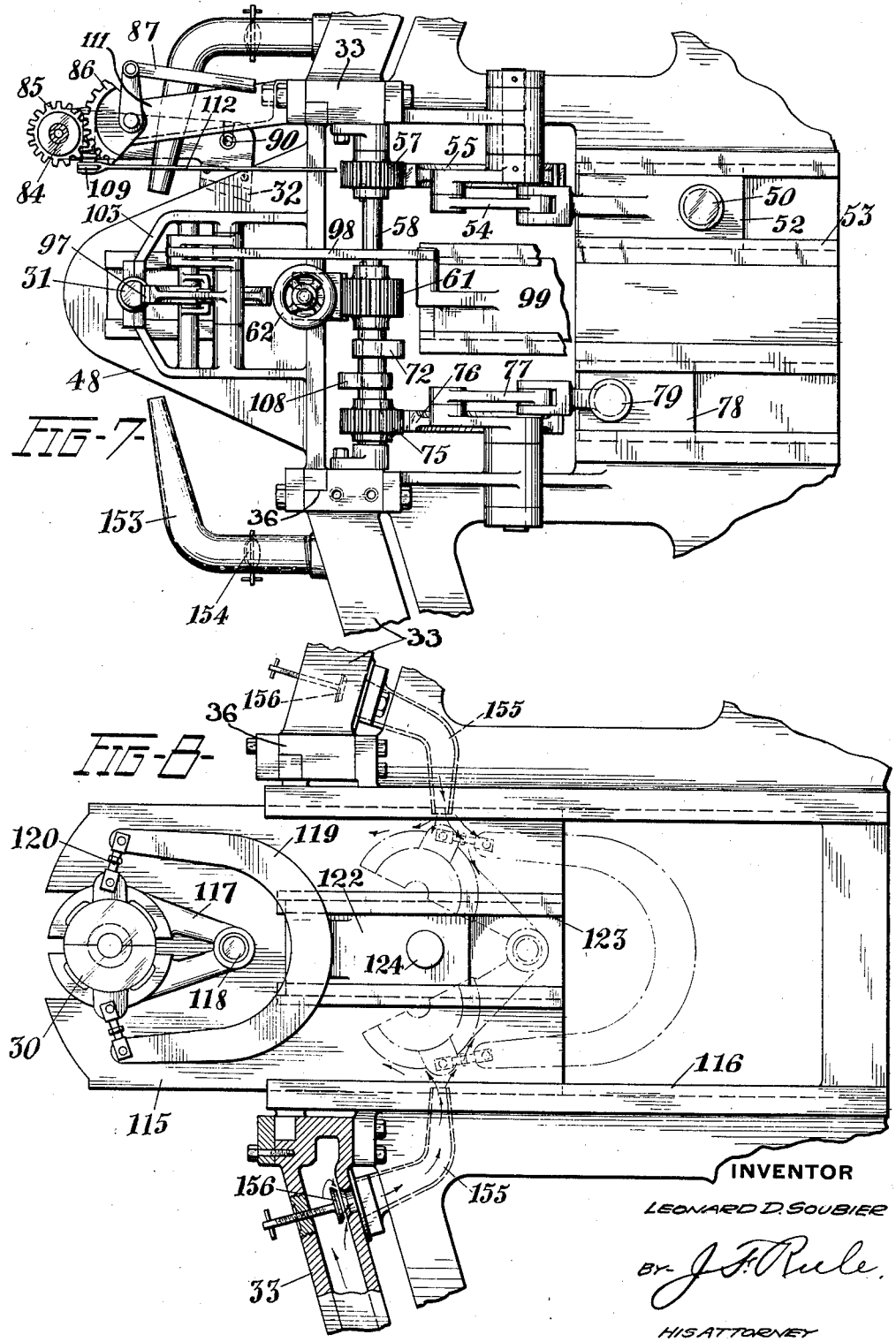
INVENTOR
LEONARD D. SOUBIER
BY J. F. Rule
HIS ATTORNEY Dec. 1, 1925.
L. D. SOUBIER
GLASS FORMING MACHINE
Filed Oct. 2, 1922
1,563,933
6 Sheets—Sheet 6
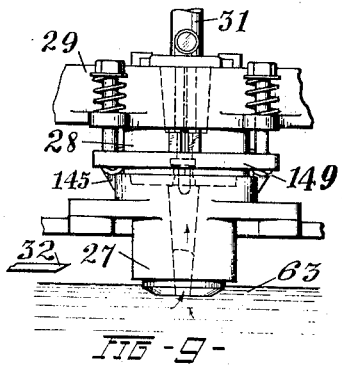
FIG-9-
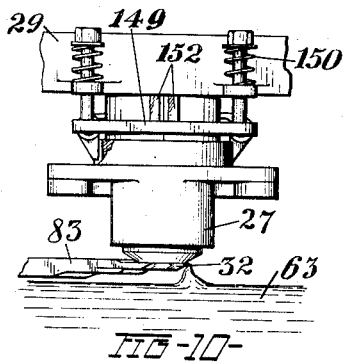
FIG-10-
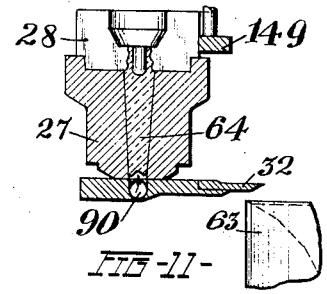
FIG-11-
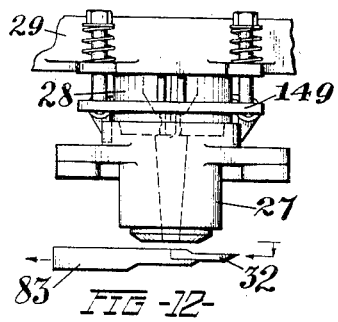
FIG-12-
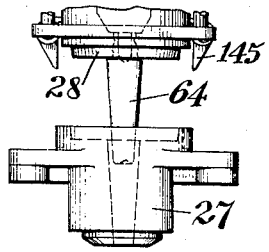
FIG-13-
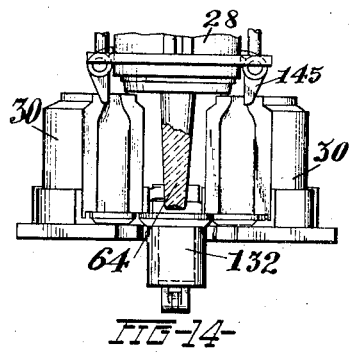
FIG-14-
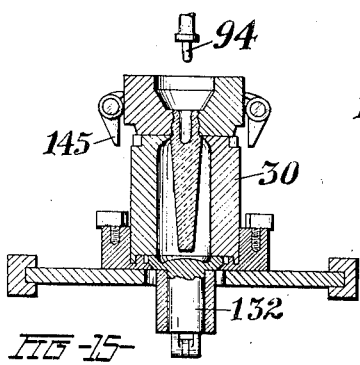
FIG-15-
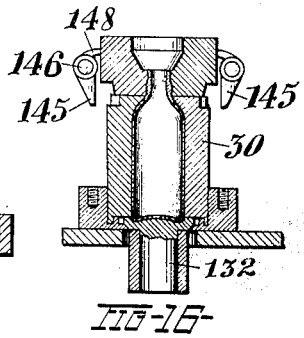
FIG-16-
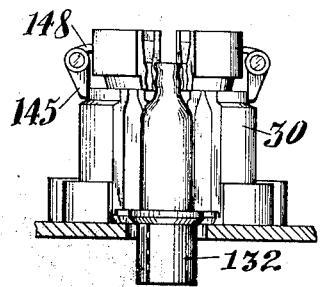
FIG-17-
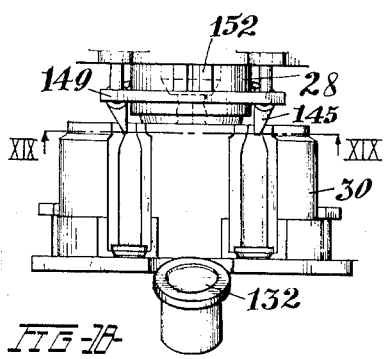
FIG-18-
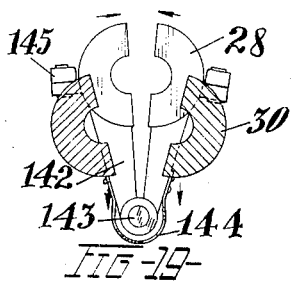
FIG-19-
INVENTOR
LEONARD D. SOUBIER
BY J. F. Rule.
HIS ATTORNEY Patented Dec. 1, 1925.

1,563,933

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed October 2, 1922. Serial No. 591,749.

*To all whom it may concern:*

Be it known that I, LEONARD D. SOUBIER, a citizen of the United States, residing at Toledo, in the county of Lucas and State of Ohio, have invented new and useful Improvements in Glass-Forming Machines, of which the following is a specification.

My invention relates to machines for forming hollow glassware. In such machines it is customary to provide a sectional body blank mold and neck mold into which the charge of glass is introduced. The blank mold sections are then separated leaving the blank of plastic glass supported in the neck mold After the blank mold has been withdrawn a finishing mold is brought into position and closed around the blank, the latter being then blown to finished form.

With such a machine, considerable time elapses after the glass has been introduced into the blank mold before the latter can be opened, particularly in a suction gathering machine where the mold after receiving its charge must be carried to a position beyond the supply tank before it is opened. There is thus considerable cooling of the blank. The bare blank is further cooled during the time required to withdraw the blank mold and bring the finishing mold into position to enclose the blank. In the manufacture of some lines of ware, particularly small bottles, and the like which require only a small mass of glass to form the article, the glass is thus unavoidably cooled to a greater extent than is desirable before it can be blown in the finishing mold. As a result, the bottles or other ware must be made unduly heavy and with the walls thicker than is desirable.

An object of the present invention is to overcome the above objection and permit the manufacture of small bottles or other ware of the desired weight and thickness of glass. To this end, I provide a machine in which the extent of cooling of the blank before it is blown in the finishing mold, is materially decreased, as compared with the usual practice, both by reducing the length of time the blank is in the blank mold and also by reducing the length of time elapsing between the opening of the blank mold and the enclosing of the blank in the finishing mold. In carrying out the invention I provide a solid blank mold, that is, a mold made in one piece instead of in sections. Provision is made for withdrawing the blank lengthwise from the blank mold and quickly enclosing the bare blank in the finishing mold.

The invention is herein shown in connection with a machine of the suction gathering type in which the blank molds are dipped into a tank or pool of molten glass and charged by suction. It is to be understood, however, that the invention is not limited to this type of machine.

A further feature of the invention relates to the elimination of the usual scar formed at the line of connection of the blank mold sections and which appears to a greater or less extent in the finished article.

Other objects of the invention will appear hereinafter.

In the accompanying drawings:

Figure 1 is a sectional elevation of a portion of a machine constructed in accordance with the principles of my invention.

Figure 2 is a front elevation on a larger scale of a section of the machine and shows the position of parts during the blowing of an article in the finishing mold.

Figure 3 is a part sectional side elevation of mechanism shown in Figure 2.

Figure 4 is a detail view of a power transmitting shaft, pinions and cams.

Figure 5 is a fragmentary view of mechanism shown in Figure 3 but with the parts in a different position, Figure 5 showing the bare blank suspended from the neck mold and the finishing mold advanced ready to be closed around the blank.

Figure 6 is a view similar to Figure 5, but with the blank mold in glass gathering position.

Figure 7 is a plan view of one of the heads or units.

Figure 8 is a part sectional plan view showing a finishing mold and associated parts.

Figures 9 to 19 inclusive are diagrammatic views showing successive steps in the gathering of a charge of glass, forming it and discharging the finished article. Figure 9 shows the blank mold in gathering position. Figure 10 shows the cutting operation. Figure 11 shows the application of air pressure, through the lower end of the blank mold. Figure 12 shows the cutter arm lowered from the mold. Figure 13 shows the blank being withdrawn lengthwise from the blank mold. Figure 14 shows the finishing mold in position to be closed around the blank. Figure 15 shows the blank enclosed in the finishing mold. Figure 16 shows the blank blown to its finished form. Figure 17 shows the finishing mold and neck mold opened. In Figure 18 the bottle has been discharged and the finishing mold is withdrawing. Figure 19 is a section at the line XIX—XIX on Figure 18.

The machine herein shown embodies various features of construction and operation found in the Owens type of suction gathering machine such as shown for example, in the patent to LaFrance, No. 1,185,687, June 6, 1916.

The machine comprises a base 21 from which rises a central stationary column 22 surrounded by a continuously rotating mold carriage 23 driven by a motor 24 connected through a train of gears to a pinion 25 running in mesh with a ring gear 26 on the mold carriage. The column 22 comprises stationary cam plates formed with cams for controlling the various operations including the opening and closing and lifting and lowering of the molds, the operation of the cutter, plunger, air valves, etc.

The machine comprises a number of sections or units arranged at equal intervals around the mold carriage, each section comprising a blank mold 27, a neck mold 28, a blowing head 29, a finishing mold 30, a plunger 31, a cutter 32, valves controlling the vacuum and air supply, and operating mechanism for the various parts.

The framework of the carriage comprises an annular series of frames each including upright hollow arms 33 (Figs. 1, 2 and 3), said frames being bolted to a hollow casting 34 which forms an air drum. The blank mold 27 of each section is supported on a frame 35 arranged to move vertically in guideways 36 formed on the inner vertical faces of the uprights 33. Vertical movements are imparted to the mold 27 by means of a stationary cam 37 on which runs a roll 38 carried by a slide block 39 mounted to reciprocate radially of the machine in a guideway 40 on the carriage. The slide block 39 is connected through a link 42 to a gear segment 43 having a pivot 44. The gear 43 drives a vertical rack 45 on the mold carrying frame 35. Said frame is adjustable vertically relative to the rack by means of a hand wheel 46 on a screw shaft 47 journalled in the rack bar and having a screw threaded connection with the frame 35.

The blowing head 29 is supported by or formed on a frame 48 which also supports the neck mold 28. The frame 48 is mounted for vertical movement in the guideways 36 such movement being controlled by a stationary cam 49 on which runs a roll 50 carried by a head 52 mounted to slide in a radial guideway 53. Said head is connected through a link 54 to a gear segment 55 having a pivot 56, said segment being geared to a pinion 57 keyed to a shaft 58. A pinion 61 also keyed to the shaft 58 (Fig. 4), drives a vertical rack 59 adjustably connected to the frame 48 by means of a screw shaft 60 having a hand wheel 62.

As the carriage rotates, each blank mold 27 in turn is brought over a tank or pool of molten glass 63. The cam 37 then operates to lower the mold into contact with the glass (Figs. 6 and 9). The cam 49 also operates to lower the frame 48, so that the neck mold 28 and blowing head 29 are in register with the blank mold. The air is now exhausted from the neck mold and blank mold, so that a charge of glass 64 is drawn by suction into the mold. The air is exhausted through the head 29 and flexible pipe 65 (Fig. 2), pipes 66 and 67, the latter (Fig. 1) being connected to a vacuum distributing head 68. A valve 69 (Fig. 2) controlling the vacuum passage is normally held closed by a spring 70 but is automatically opened by a cam 72 engaging the stem 73 of the valve as the head 29 is lowered. The cam 72 (see Figs. 4 and 7) is carried by a sleeve 74 journalled on the shaft 58 for rotation independently of the shaft. Said sleeve has keyed thereto a pinion 75 which runs in mesh with a gear segment 76 connected through a link 77 with a slide block 78 carrying a roll 79 running on a cam 80 (Figs. 1 and 3).

After the mold has received its charge, the mold carrying frames 35 and 48 are lifted so that the mold clears the pool of glass. The knife 32 then operates (Fig. 10) to sever the string of glass extending from the mold to the pool. This knife is carried on a knife arm 83 attached to the lower end of a rock shaft 84, rocked by means of a pinion 85 keyed to the rock shaft, said pinion meshing with a gear segment 86 connected through a link 87 to a slide 88 (Fig. 1) carrying a roll running on a cam 89. The knife is carried beyond the Figure 10 position in which the glass has been severed, to the Figure 11 position, so that a port 90 is brought into register with the lower end of the blank mold. Air pressure is now supplied through said port to force the glass upward a short distance below the bottom edge of the mold and to compact the glass in the mold. The application of air pressure in this manner reduces or eliminates the scar ordinarily found in finished ware caused by the chilling and deformation of the glass due to the severing operation. Air pressure is supplied to the port 90 through a flexible hose 92 (Fig. 2) connecting the knife arm with a pipe line 93 leading to a source of air pressure.

An initial blow opening is formed in the blank 64 by a plunger tip 94 carried by a head 95 removably attached to the plunger rod 31. The latter is formed with rack teeth 96 in mesh with a gear segment 97 connected through a link 98 to a slide block 99 carrying a cam roll 100 running on a cam 102. The gear segment 97 is mounted on a bracket 103 on the frame 48, said bracket being provided with a vertical bearing sleeve 104 through which the plunger rod 31 extends. The plunger tip 94, which is in its lowered position (Fig. 6) while the mold is being charged, is withdrawn upwardly by the cam 102, preferably before the air pressure is applied through the knife arm to the lower end of the blank mold. Simultaneously with the application of air pressure at the lower end of the blank, air pressure is supplied momentarily through the neck mold to the upper end of the blank. This air pressure is transmitted through the pipe line 66, 65 and head 29 (Fig. 2). The air pressure is controlled by a valve 105 between the pipe 66 and an air pressure pipe 106. The valve 105 is closed by a spring 107 and opened by a cam 108 which engages the valve stem, said cam being carried on the sleeve 74.

After the air pressure has been applied at the upper and lower ends of the blank as above described, the knife arm 83 is separated from the blank mold (Fig. 12) by a vertical downward movement of the knife arm relative to the mold, and the shaft 84 rocked to swing the knife arm to one side. The shaft 84 is carried by an arm 111 on the frame 33. The lifting and lowering of the knife arm 83 relative to the mold is effected by means of a bell crank lever 109 fulcrumed at 110 on the arm 111, the upper arm of said lever being connected at its upper end to a link 112 (Fig. 1) connected to a slide block 113 operated by a cam 114.

After the initial blowing of the blank as above described, the cam 49 operates to lift the frame 48, thereby carrying the neck mold, blowing head and plunger vertically upward away from the blank mold, so that the blank 64 is withdrawn from the blank mold (Fig. 13) and left suspended from the neck mold. The blank mold which is preferably made solid or in a single piece has its mold cavity tapered or shaped to permit this endwise withdrawal of the blank. When the blank is lifted out of the blank mold the open finishing mold 30 is moved radially outward to a position beneath the neck mold and then closed to enclose the blank.

The finishing mold (see Figs. 3 and 8) is carried on a horizontally disposed frame or supporting plate 115 slidable radially of the machine in guideways 116 on the carriage. The finishing mold is made in horizontally separable sections carried by arms 117 pivoted on a pin 118 on the plate 115. A yoke 119 is connected through links 120 to the mold sections, said yoke being connected to a slide block 122 slidable radially in guides 123 on the plate 115. A cam roll 124 on the block 122 runs on a stationary cam 125. Said cam operates through the yoke 119 and links 120 to open and close the finishing mold. The mold and its support 115 are projected bodily radially of the machine by means of a cam 126 engaged by a roll 127 on the plate 115. The finishing mold is first moved outward by the cam 126 and then closed by the cam 125. These movements of the finishing mold may take place while the blank mold is travelling with the carriage to a position beyond the gathering tank. The blank mold after it has reached a position to clear the wall of the tank may be lowered to avoid interference with the finishing mold and parts carried on the frame 115.

When the finishing mold has enclosed the blank (Fig. 15) air pressure is supplied for blowing the blank to its finished form (Fig. 16). This air pressure is controlled as is usual in Owens machines, by a slide valve 128 connected to a lever 129 operated by a cam 130 on the gear segment 97. A mold bottom 132 for the finishing mold is removably supported in a bearing sleeve 133 (Fig. 5) fixed to a pivot pin 134 on the under side of the frame 115. An arm 135 fixed to the pin 134 is connected through a link 136 to a rod 137 carrying a roll 138 running on a cam 139. A spring 140 holds the roll 138 against its cam, the latter serving to control the tilting movements of the mold bottom.

The neck mold 28 comprises horizontally separable sections carried by arms 142 fulcrumed on a pivot pin 143 depending from the frame 48. The neck mold sections are normally held together by a spring 144. After the bottle has been blown, the finishing mold and neck mold are opened, as shown in Figure 17. The neck mold is opened by the finishing mold which during its opening movement engages dogs 145 fixed to pivot pins 146 (see Fig. 3) journalled in lugs 147 on the neck molds. Each dog 145 has a tail 148 which engages the neck mold and limits the outward swinging movement of the dog. As these dogs project downward into the path of the finishing mold, the latter as it opens, operates positively to open the neck mold to the Figure 17 position. After the mold is thus opened, the mold bottom 132 is tilted through the operation of the cam 139, to discharge the bottle. The finishing mold 30 is now withdrawn radially inward. This movement (see Fig. 19) releases the dogs 145, permitting the neck mold to be closed by its spring. When the finishing mold closes around the blank, the dogs 145 swing inward, permitting the mold sections to pass them. The neck mold sections may be prevented from sagging by the usual supporting plate 149 (Fig. 2) which, under the tension of springs 150, bears upwardly against lugs 152 on the neck mold sections.

Air for cooling the blank molds may be supplied through blow pipes 153 (Figs. 2 and 7) connected to the hollow arms 33, the air supply being regulated by valves 154. Air for cooling the finishing molds may likewise be supplied through the hollow arms 33 and blow pipes 155 (Figs. 2 and 8). The supply of air is regulated by valves 156.

Modifications may be resorted to within the spirit and scope of my invention.

What I claim is:

1. In a glass forming machine, the combination of a neck mold, a blank mold in register therewith, automatic means for introducing a charge of glass by suction into said molds while they are together and in register, and means to separate the molds by a relative lengthwise movement of the molds.

2. In a glass forming machine, the combination of a neck mold, a blank mold in register therewith, means for introducing a charge of glass in said molds by suction, and means to withdraw the glass from the blank mold by a relative movement of the molds in the direction of their axis.

3. In a glass forming machine, the combination of a single piece body mold, having the mold cavity extending lengthwise therethrough, a neck mold to register therewith, and means to charge the molds with glass by suction.

4. In a glass forming machine, the combination of a mold carriage, a blank mold, a neck mold, means to effect a relative vertical movement of the said molds into and out of register, means to charge the molds with glass by suction, a finishing mold, and means to move the finishing mold horizontally into register with the neck mold.

5. In a glass forming machine, the combination of a neck mold, a blank mold in register therewith, means to introduce a charge of glass by suction into the molds, and means to move the neck mold vertically and thereby withdraw a blank of glass from the blank mold.

6. In a glass forming machine, the combination of a neck mold, a blank mold in register therewith, means to introduce a charge of glass by suction into the molds, means to move the neck mold vertically and thereby withdraw a blank of glass from the blank mold, a sectional finishing mold, and means to move it laterally and close it around the blank.

7. In a glass forming machine, the combination of a suction gathering blank mold, a neck mold above and in register therewith, and means to move the neck mold vertically, and thereby withdraw the blank of glass from the blank mold while in vertical alignment therewith.

8. In a glass forming machine, the combination of a suction gathering blank mold, a neck mold above and in register therewith, and means to move the neck mold vertically, and thereby withdraw the blank of glass from the blank mold while in vertical alignment therewith, a finishing mold, means to move it transversely into a position between the neck mold and blank mold and close it around the blank, and means to blow the blank in the finishing mold.

9. In a glass blowing machine, the combination of a mold carriage, a blank mold thereon, means to rotate the carriage and bring said mold over a pool of molten glass, a neck mold above and in register with said blank mold, means to draw a charge of glass by suction into the molds, means to lift the molds, means to sever the glass at the lower end of the blank mold, and means to move the neck mold vertically from the blank mold and thereby withdraw blank from the blank mold.

10. In a glass blowing machine, the combination of a mold carriage, a blank mold thereon, means to rotate the carriage and bring said mold over a pool of molten glass, a neck mold above and in register with said blank mold, means to draw a charge of glass by suction into the molds, means to lift the molds, means to sever the glass at the lower end of the blank mold, means to form an initial blow opening in the upper end of the blank, means to simultaneously apply air pressure at the two opposite ends of the blank, while in said molds, and means to separate the molds by a relative vertical movement thereof, leaving the blank suspended from the neck mold.

11. In a glass blowing machine, the combination of a mold carriage, a blank mold thereon, means to rotate the carriage and bring said mold over a pool of molten glass, a neck mold above and in register with said blank mold, means to draw a charge of glass by suction into the molds, means to lift the molds, means to sever the glass at the lower end of the blank mold, means to form an initial blow opening in the upper end of the blank, means to simultaneously apply air pressure at the two opposite ends of the blank, while in said molds, means to separate the molds by a relative vertical movement thereof, leaving the blank suspended from the neck mold, a sectional finishing mold on the carriage, and means to move it bodily transversely into a position between the separated neck mold and blank mold.

12. In a glass forming machine, the combination of a sectional neck mold, a sectional finishing mold, means to bring the finishing mold sections together in register with the neck mold, and dogs pivoted to the neck mold, said finishing mold sections being arranged to engage said dogs and open the neck mold as the finishing mold is opened.

Signed at Toledo, in the county of Lucas and State of Ohio, this 28th day of Sept., 1922.

LEONARD D. SOUBIER.